E. H. SMITH.
PACKING.
APPLICATION FILED MAY 11, 1914.

1,147,564.

Patented July 20, 1915.

Witnesses

Inventor
Ernest H. Smith

UNITED STATES PATENT OFFICE.

ERNEST HOPE SMITH, OF CLEVELAND, OHIO.

PACKING.

1,147,564.     Specification of Letters Patent.     Patented July 20, 1915.

Application filed May 11, 1914. Serial No. 837,884.

*To all whom it may concern:*

Be it known that I, ERNEST HOPE SMITH, a citizen of the United States, residing in the city of Cleveland, in the county of Cuyahoga and the State of Ohio, have invented a certain new and useful Improvement in Packing, of which the following is a specification.

The object of this improvement is to provide a packing for stuffing boxes and the like which will wear longer, cause no unnecessary friction between the packing and the rod or plunger, and be more sensitive to any disalinement or irregularity of the rod or plunger.

Figure 1:
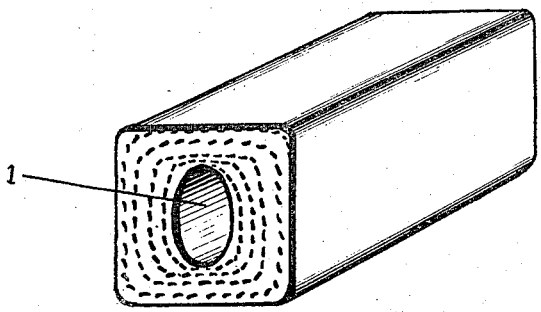
Figure 2:
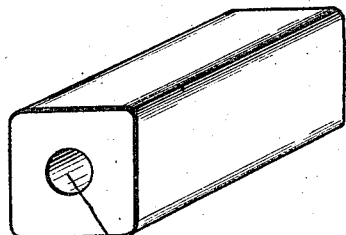
Figure 3:
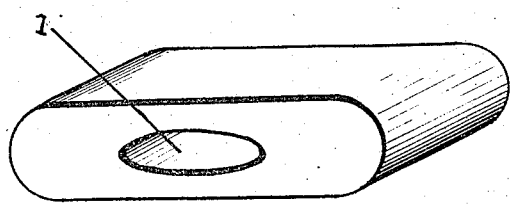
Figure 4:
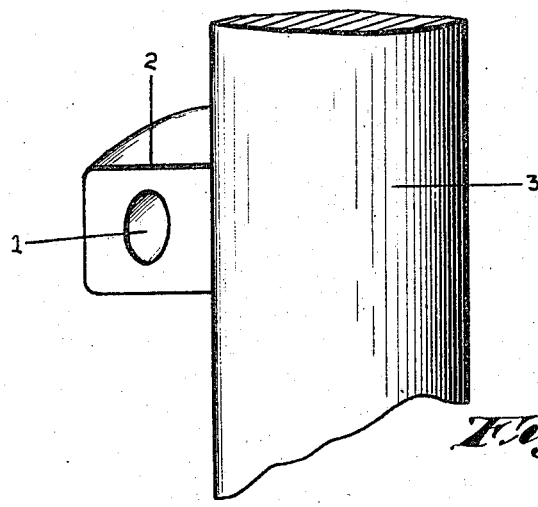

To such end and object my invention provides a packing constructed of fibrous material cemented or woven together with a hollow space or cavity extending lengthwise throughout its length, the packing being of substantially rectangular shape in cross section and the top and bottom walls of the packing being thinner and of less body than the side walls, as illustrated in Figure 1. Fig. 2 is a perspective view of an old form of packing. Fig. 3 is a perspective view of my packing after expansion. Fig. 4 is a perspective view of my packing applied to a rod.

By constructing the top and bottom walls thinner and of less body than the side walls the friction between the packing and the rod or plunger is reduced in proportion to the difference between the thickness of the side walls and that of the top and bottom walls. As friction between the packing and the rod or plunger wears the packing away, by reducing the friction the packing wears longer. The top and bottom walls of the packing being thinner than the side walls there is never more pressure exerted laterally upon the rod or plunger than is necessary to withstand the initial steam, air or hydraulic pressure upon the packing and consequently there is no unnecessary friction between the packing and the rod or plunger. The thinner top and bottom walls of the packing are less firm and more resilient than if constructed the same thickness as the side walls. Consequently the packing will expand and contract laterally more readily and will be more sensitive to any disalinement or irregularity of the rod or plunger. By constructing the top and bottom walls thinner and of less body than the side walls the weight of any given length and size of packing is reduced from 15% to 20% as compared to the old style hollow packings which are constructed with all walls of equal thickness. This is an important improvement in the manufacture of hollow packings as it enables the manufacturer to produce the packing more economically. From a given weight of raw material of the same nature a greater quantity of the applicant's packing can be manufactured than of the old style hollow packings. For example, if it requires five pounds of raw material to produce twelve feet of five-eighths inch packing constructed with all walls of equal thickness as in the old style hollow packings, it will only require a little over four pounds of the same material to manufacture an equal length and size of the applicant's improved hollow packing.

What I claim as new and desire to secure by Letters Patent is:

A hollow center packing of substantially rectangular shape in cross section composed of fibrous material cemented or woven together, the top and bottom walls being of less body and thinner than the side walls, substantially as described.

In testimony whereof I have hereunto signed my name.

ERNEST HOPE SMITH.

In presence of—
   SARAH M. HAWLEY,
   GEO. A. WELLINGTON.

Copies of this patent may be obtained for five cents each, by addressing the "Commissioner of Patents, Washington, D. C."